April 20, 1971     C. RADZIO     3,575,769
TUBE SIDE SEAMING METHOD AND APPARATUS
Filed March 27, 1968     4 Sheets-Sheet 2
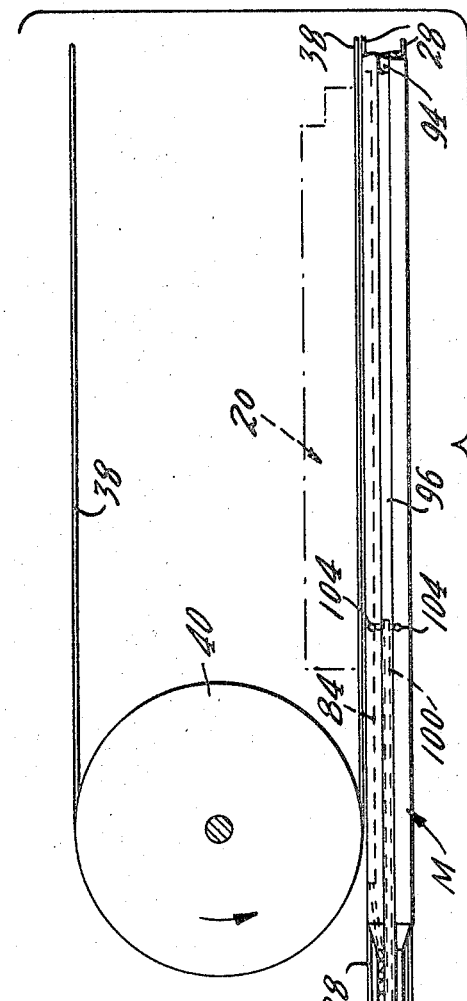
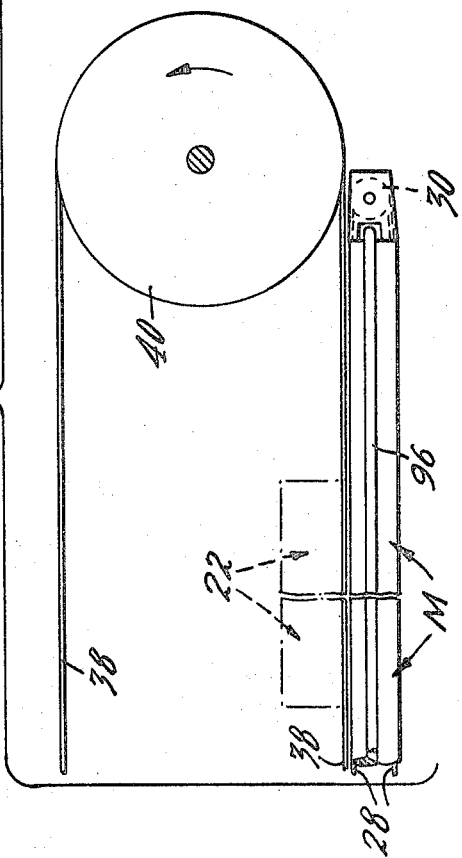
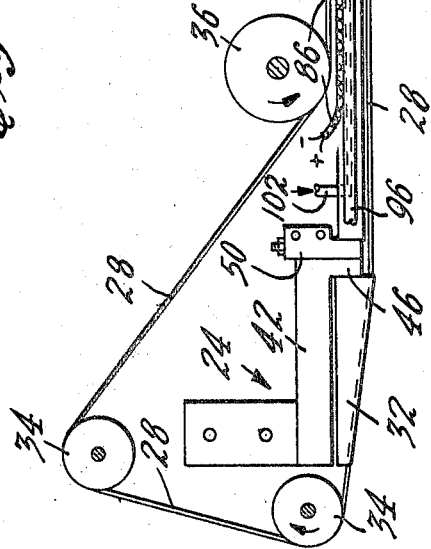
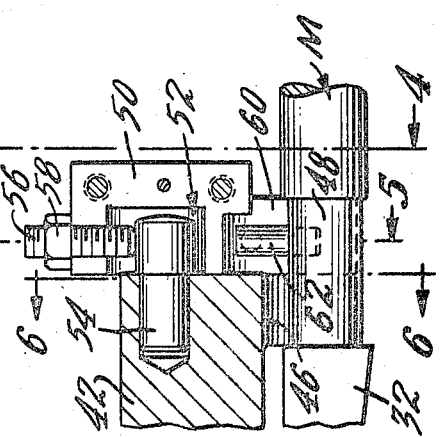
INVENTOR.
CARL RADZIO

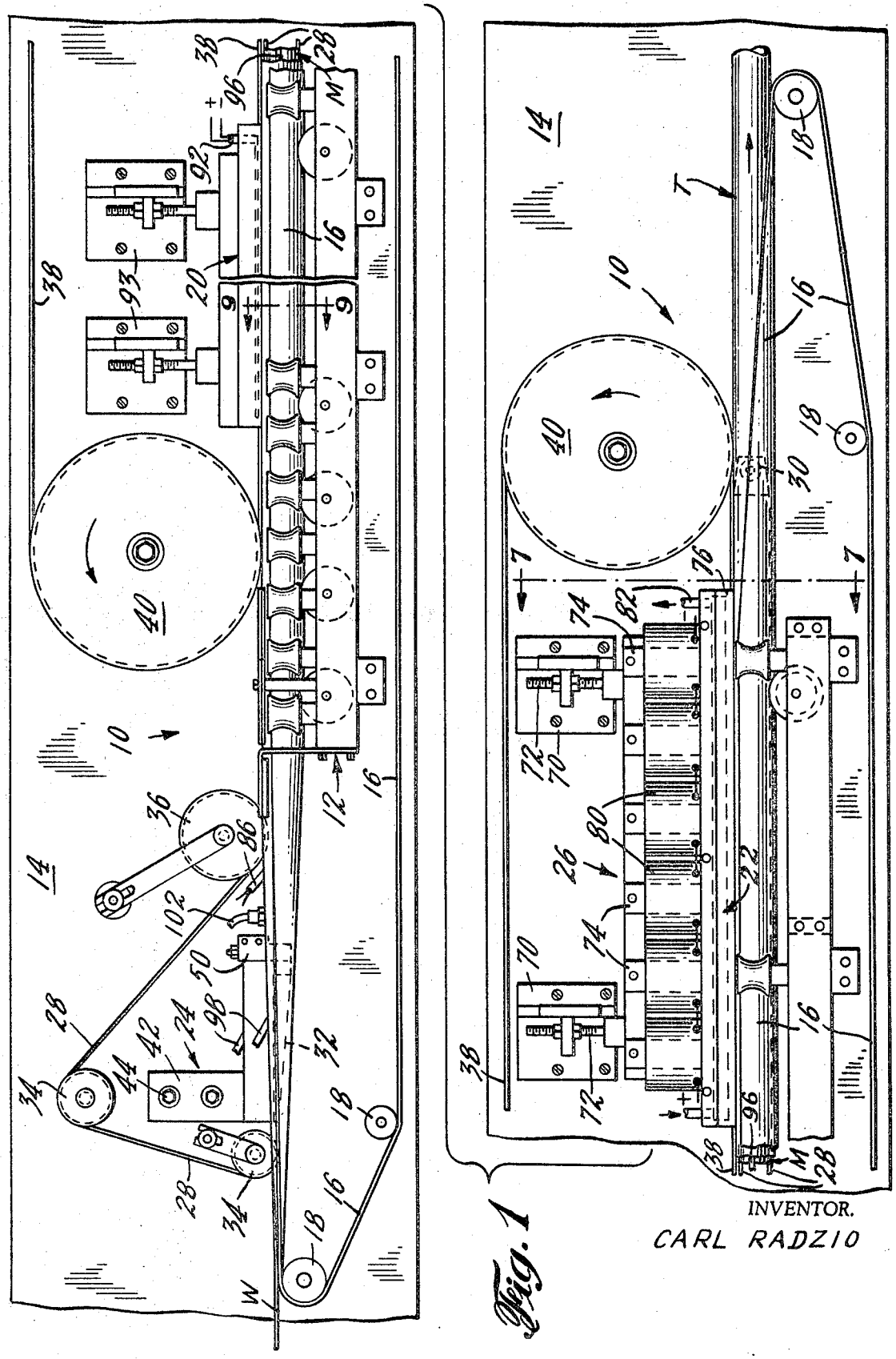

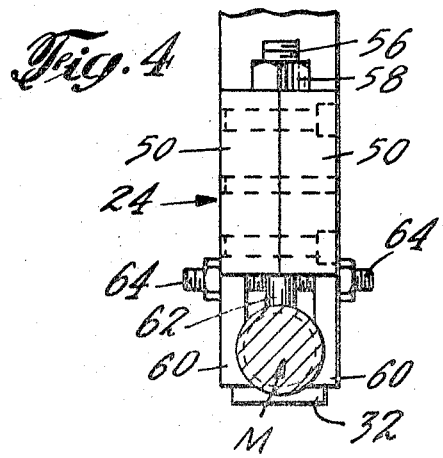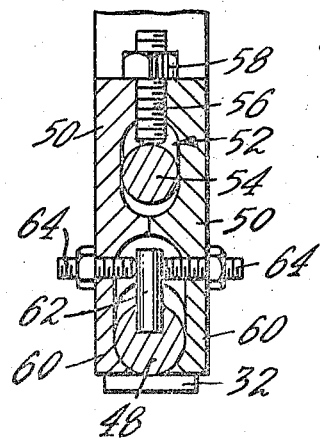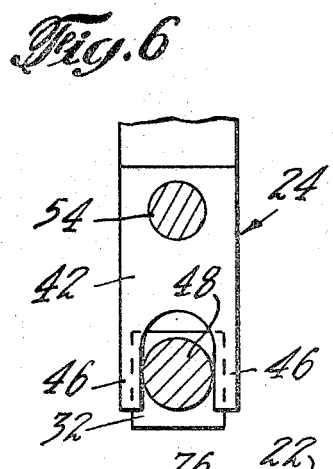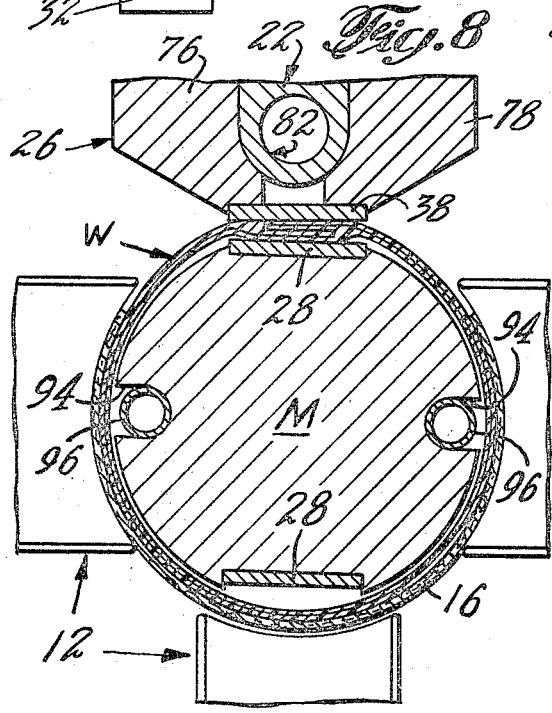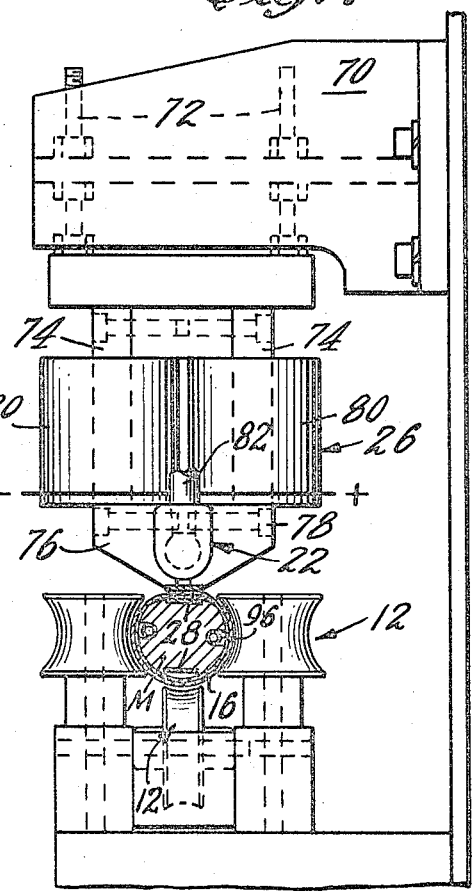
INVENTOR.
CARL RADZIO

April 20, 1971 C. RADZIO 3,575,769
TUBE SIDE SEAMING METHOD AND APPARATUS
Filed March 27, 1968 4 Sheets-Sheet 4

INVENTOR.
CARL RADZIO

United States Patent Office 3,575,769
Patented Apr. 20, 1971

3,575,769
TUBE SIDE SEAMING METHOD AND APPARATUS
Carl Radzio, Washington, N.J., assignor to American Can Company, New York, N.Y.
Filed Mar. 27, 1968, Ser. No. 716,495
Int. Cl. B29d 23/10
U.S. Cl. 156—466
17 Claims

ABSTRACT OF THE DISCLOSURE

Longitudinal seaming apparatus and method for tubed plastic web material having a floating mandrel for internally supporting the tube during longitudinal seam welding and cooling, wherein the mandrel is magnetically supported at its downstream entubed free end as well as being rotatably and vertically adjustable from its upstream mounting externally of the tube to precisely shape the longitudinal tube seam.

BACKGROUND OF THE INVENTION

In recent years, the development of plastic or plastic laminate collapsible tubes has received considerable attention as an advantageous and effective substitute for the well known all-metal tube. More particularly, multilayer laminate tubes possess highly desirable chaarcteristics of inertness, decorative ability, versatility of laminate choice for particular contents, etc. Such tube material and its advantages are illustrated by and set forth more fully in U.S. patents to Brandt et al. 3,347,419 and Scheindel 3,307,378, for example. The tube making technique by which the tubes are made is characterized by a longitudinal seam wherein the plastic or plastic laminate material is initially fed in web form and thereafter lapped and fused along a longitudinal seam before the resulting tubular material is cut into tube lengths, provided with closures, and filled, to form a finished article.

While the art of longitudinally seaming lapped edge portions of longitudinally fed web material has been long practiced, particular problems arise in the satisfactory longitudinal seaming or fusing of multi-ply laminates including one or more plies which may be susceptible to attack by the ultimate contents of the tube, as may be the case with a metal-moil layer, or wherein exposure of a ply internally of the tube may aid in undesirable ply delamination as a result of continued contact with the tube contents. Thus it becomes imperative that when the seam is formed that the ply outwardly of the innermost plastic ply or layer be adequately covered and not exposed in the slightest degree, whereby the inner plastic ply forms a smooth and unbroken interior surface for the ultimate formed tube.

Another difficult side seaming problem resides in providing for adequate high-speed feeding of the web material during tubing thereof consistent with adequate internal support of the lapped joint during seaming thereof, while yet reducing friction sufficiently to not unduly hinder the passage of the formed tube over a forming mandrel.

One such apparatus and method achieving noteworthy results in these regards is that disclosed in the co-pending application of A. K. Grimsley et al., Ser. No. 331,408, now Pat. 3,338,017, which is directed to the effective longitudinal seaming of webs of laminated stock which are tubed so as to have longitudinal lap seams of the type aforesaid.

BRIEF SUMMARY OF THE PRESENT INVENTION

The present invention constitutes a significant improvement in the art of longitudinal lap seaming of plastic tubes, and particularly composite or multilayer plastic tubes having one or more foil and/or paper layers in addition to a primary inner layer of thermoplastic material.

More particularly, the present invention embraces an elongated mandrel for internally supporting, sizing and guiding the tube. The mandrel in turn is floatingly supported at its upstream end prior to tube formation thereabout, whereby at its free or downstream end, the mandrel is manifestly lacking in any direct mechanically connected support inasmuch as the web is tubed entirely thereabout. According to the present invention, the mandrel is supported thereat by a magnet assembly disposed externally of the mandrel and surrounding tube. The tube-forming mandrel has thereby downstream support whereby the mandrel is prevented from drooping and causing problems of binding or the like which result in unsatisfactory feeding of the tube material and improper side seaming generally, while the somewhat floating and adjustable upstream mounting insures proper feeding and tracking of the web material about the mandrel.

A further significant aspect of the present invention resides in the fact that the resultant seam pressure exerted by the magnetic attraction between the magnet assembly and the mandrel serves to properly and precisely shape the longitudinal seam during fusing and cooling thereof. In this connection, the mandrel is mounted at its upstream end for vertical adjusting movement so as aid in regulating the seam-forming pressure as required for laminates of varying gauge or sealing characteristics.

The said mandrel further includes a generally planar seam-forming area, and as a further major feature of the invention, the mandrel may be arcuately adjusted throughout a limited range so as to precisely predetermine the degree and character of angular pressure upon the joint being formed.

Other objects and advantages of the present invention will be apparent from the following description taken in connection with the accompanying drawings, in which FIG. 1 is a side elevation of a complete side seaming apparatus according to the persent invention and having a web being tubed thereon, the apparatus being broken midway of its length in the drawing for purposes of illustration, it being understood that the lower illustration constitutes a continuation of the upper illustration;

FIG. 2 is a side elevation of the mandrel of the present invention without any tube being formd therearound, along with adjunct supporting structure, the figure being broken into two illustrations as in FIG. 1;

FIG. 3 is an enlarged fragmentary view in side elevation showing the connection of the mandred at its upstream end to its cantilever support;

FIG. 4 is an upstream end view of the mandrel mounting taken on the line 4—4 of FIG. 3, the mandrel being seen in section;

FIG. 5 is a sectional view taken on the line 5—5 of FIG. 3 showing further the mandrel mounting;

FIG. 6 is a view taken on the line 6—6 of FIG. 3 showing a further upstream view of the mandrel and its mounting;

FIG. 7 is a view looking upstream toward the magnet assembly and taken on the line 7—7 in FIG. 1, the mandrel being shown in section;

FIG. 8 is an enlarged sectional view of the mandrel and tube being longitudinally seamed thereon just upstream of FIG. 7, the magnet assembly and guide rollers being fragmentarily shown;

Figure 9:
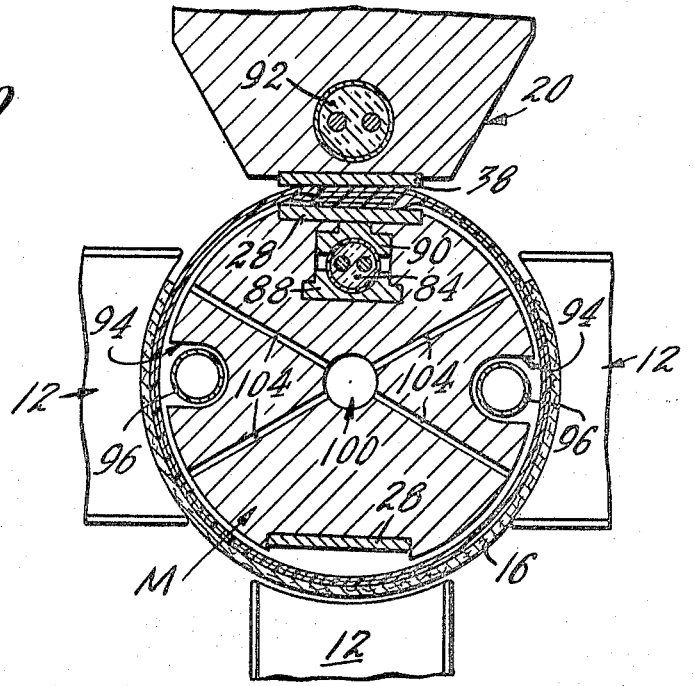
FIG. 9 is an enlarged sectional view of the mandrel and tube thereon at the heating station, the heater shoe being fragmentarily shown.

Referring in more detail to the drawings, the overall apparatus 10 with which the present invention is embodied is seen in FIG. 1 and comprises longitudinal tube-forming and side-seaming devices for a web W of multi-ply plastic material, which material may be similar to that employed in the finished tubes of the aforementioned Brandt et al. and Scheindel patents. The web W is initially flat-fed from a roll supply thereof and subsequently tubed by progressive upfolding and infolding of the web edge margins about a mandrel M as by concave side and subjacent roller sets at 12. The roller sets have no mandrel-supporting function whatever but serve to controllably guide with minimum friction the endless tube-shaping band 16 which latter is suitably trained about idlers 18 rotatably journaled on a base or frame 14. The marginally lapped tube is thereafter longitudinally fusion-seamed by a frame-mounted heating assembly 20. After cooling of the seam as by the cooling shoe 22, the completed tube T is delivered at the right in FIG. 1 and possesses a longitudinal seam S (FIG. 11) of a character to be described more particularly hereinafter.

During the seaming operation, the tubed web is internally supported as aforesaid by an elongated mandrel M. At its upstream end, mandrel M is adjustably supported for limited floating movement by a cantilever-like mounting 24 to be described more fully hereinafter. Near the downstream end of mandrel M, a magnet assembly 26 is mounted on frame 14 in cooperative association with cooling shoe 22 thereby to be disposed in overlying relation to the mandrel and thus positively supports the same thereat. With the mandrel thus relatively fixed at the downstream end as compared to the upstream end thereof, more precise seam formation is effected as set forth further hereinafter.

So as to avoid relative motion between the tubed web W and the stationary mandrel during the seaming operation, the mandrel is slotted along its top and bottom surfaces through the seaming area to provide guideways for the active and return runs of endless tape 28. The tape 28 may be of an elastomeric or other material such as fiberglass, and is preferably Teflon-coated to minimize sticking of the softened plastic material to the tape. The active run thereof provides a substantially planar and anvil-like surface for shaping the seam on the tube interior. The belt or tape 28 is trained about a small pulley 30 rotatably mounted in the downstream end of the mandrel, while at the upstream end thereof as seen in FIG. 2, the belt passes along heel 32 of the mandrel and thence about suitable idler and tensioning pulleys 34, 36. Cooperating with the mandrel or anvil belt 28 is a third endless belt 38 which passes about suitable pulleys and whose active run extends longitudinally of the mandrel M as seen in FIG. 1 and FIG. 8 in overlying relation to the web lap to shape the exterior of longitudinal seam S. The several belts 28, 38 as well as web guiding belt 16 are disclosed more fully in the aforesaid Grimsley et al. application and are not per se part of the present invention.

With further reference to the upstream cantilever mounting 24, the same includes a suitable heavy L-shaped bracket 42 secured in spaced relation to frame 14 as by cap screws 44. The forwardly extending leg of bracket 42 terminates in a depending fork 46 as best seen in FIG. 6, which embraces reduced neck 48 of mandrel M forwardly of mandrel tape guide heel 32.

Coupled to the base of forward leg of bracket 42 is mandrel saddle block 50 which is internally recessed at 52 to loosely overfit a pin or cap screw 54 threaded or otherwise secured to the leg face of bracket 42. An adjustable screw 56 is tapped through the upper portion of the saddle block 50 and bears against the upper surface of pin 54. It will readily be seen that adjustment of screw 56 as by means of an associated threaded nut 58 will vary the vertical position of saddle block 50 with respect to bracket 42.

The lower portion of saddle block 50 comprises bifurcated saddle legs 60 as clearly seen in FIG. 5, which loosely embrace and provide primary support for the upstream reduced portion 48 of mandrel M. As the mandrel is constrained for shifting movement only in a vertical direction within saddle 60 (and within depending fork 46 of bracket 42), it will be seen that vertical adjustment of the mandrel relative to bracket 42 is effected by adjustment of the threaded connection 56 at the top of block 50, whereby saddle 60 elevates or permits lowering of the mandrel upstream end.

The reduced mandrel 48 is further provided with means such as a pin 62 extending upwardly therefrom within the saddle legs 60, this pin being controllably retained between like adjustable screws 60 carried by either saddle 60, as best seen in FIG. 5. It will be seen that relative advance and retraction of screws 64 with respect to each other will effect limited rotational movement of pin 62 and therefore of mandrel M about its longitudinal axis within the saddle 60 for a purpose to be hereinafter set forth.

It will be seen that while adjustable in two directions, the mandrel upstream end is capable of limited floating movement in a vertical direction by virtue of the unrestrained gravity support of mandrel end 48 by saddle 60.

With respect to the downstream support for mandrel M, magnet assembly 26 is supported from and in spaced relation to frame 14 as by brackets 70 and adjustable connections 72, as best seen in FIGS. 1 and 7. The connections 72 in turn support a plurality of electromagnetic cores 74 which terminate on either side of a vertical plane through the mandrel center line in a pair of elongated pole pieces 76, 78 whose tapered noses are configured to provide a guideway for tape 38, see FIG. 8. The several cores, shown as twelve in number, are each provided with magnet windings 80 in usual manner, whereby upon electrical energization thereof, the appreciable magnet flux density developed between the elongated nose pieces 76, 78 serves to attract the metallic mandrel upwardly theretoward, thereby to prevent drooping or bending curvature of the cantilevered mandrel.

Further, and importantly, the magnetic downstream support relieves the several rollers as 12 from any significant mandrel-supporting function and also serves to establish a seam-shaping pressure between the seam-forming tapes 28, 38.

In this connection it should be noted that the pole pieces 76, 78 of the magnet assembly embrace the cooling shoe 22 as seen in FIGS. 7 and 8, the shoe having a cooling fluid conduit 82 extending therethrough in proximity to the joint being formed.

In addition to the guideways for the upper and lower runs of tape 28, mandrel M is further provided with heating and cooling means for respective cooperation with the heating and cooling stations at 20 and 22. As seen in FIGS. 2 and 9, the mandrel is recessed beneath the upper run of tape 28 to receive an electrical heating element 84 from which leads 86 extend rearwardly and externally of the mandrel. The element is suitably supported as by a stainless steel spacer 88, while an upper spacer 90 is preferably of a material having good heat transfer properties, such as beryllium. Element 84 thus aids heating element 92 of heating assembly 20 in softening and fusing the joint. Principal heat, however, is supplied by heating element 92 in the assembly 20 which latter is suiably mounted by brackets 93 onto frame 14, mandrel heater 84 being maintained at a lower temperature.

Mandrel heating element 84 terminates at or near the end of heating shoe 20 as seen in FIG. 2, inasmuch as seam cooling and final shaping occurs during the remainder of mandrel travel, particularly at cooling station 22. To this end, the mandrel is provided with outwardly facing grooves 94 extending substantially the full length thereof for reception of a hairpin-like cooling conduit 96 therein. Terminal ends 98 (FIG. 1) adjacent mounting 24 provide supply and exhaust lines for flow of cooling fluid therethrough. Conduit 96 passes from one groove 94 to the other through an opening in the mandrel at the downstream end adjacent pulley 30.

Inasmuch as the desired cooling is to take place downstream of the heating station, means are provided to minimize undesirable heat transfer in the fusing zone along heaters 84 and 92. To this end, and as seen in FIG. 9, the mandrel grooves 94 through the heating zone are sufficiently enlarged so that the cooling conduit 96 has no or only negligible contact with the mandrel therealong. Forwardly thereof and through the cooling zone, however, conduit 96 is in maximum contact and resultant heat transfer relation with the mandrel, and is accordingly supported and positioned thereby, as seen in FIG. 8.

Mandrel M is also provided with a central bore 100 connected to an air supply at 102, the bore 100 having radial passages as at 104 (FIG. 9) leading to the mandrel surface at diverse points therealong. The supplied air flow thus passes outwardly from bore 100 to the surface of the mandrel and beneath the web W tubed therearound. While this air flow may aid feeding of the tube along the mandrel, the principal function thereof is to properly size or control the internal diameter of the tube being formed. As is evident, prior to setting of the fused joint, a relatively greater air pressure will tend to lessen the longitudinal overlap, while a lesser pressure will permit belt 16 to infold and lap the web edges to a somewhat greater extent. Accurate sizing is thus obtained.

In operation, web W is led from a conventional roll supply thereof into the apparatus. As noted, the web may be a multi-ply laminate on the order of the aforesaid U.S. patents. For purposes of illustration, there is shown in the drawings, particularly the enlarged views of FIGS. 10 and 11, a three-layer laminate comprising innermost and outermost layers P, P of heat sealable thermoplastic material and an intermediate layer of a barrier material, such as metal foil F.

Figure 10:
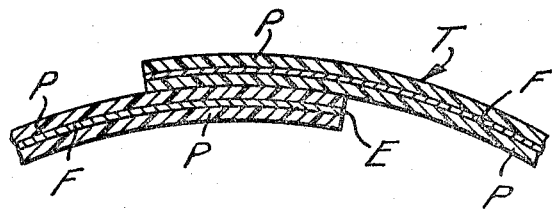
FIG. 10 is a fragmentary end sectional view showing the initial lapped position of the web side margins before fusing the seam; and, FIG. 11 is a fragmentary end sectional view of a proper finished seam as produced by the present invention.

As disclosed hereinabove, and in the aforesaid application, web W is led from substantially planar relation into tubed relation with the longitudinal web margins overlapped as seen in FIG. 10 as the same is guided into curved relation by roller set 12 and belt 16. As the lap passes beneath the heating assembly 20, it is firmly held between belts 28, 38, FIG. 9. Heat is applied to the seam by elements 92 and 84 to fuse the joint into a leakproof seam.

The tube T with its still partially molten joint S then immediately passes beneath cooling shoe 22 whereas coolant line 82 along with mandrel conduit 96 extracts the remaining heat from seam S to solidify the same.

As set forth hereinabove, during the fusing and cooling operation, the lapped tube material is advanced between the substantially planar faces of belts 28, 38 under compressive seam-shaping pressure resulting from the magnetic attraction of mandrel M to the pole pieces 76, 78 of magnet assembly 26, and which also supports the mandrel downstream end thereby. A suitable conventional control may be associated with the windings 80 to regulate and shut off the energizing current as required.

In addition to magnet-effected seam-shaping pressure, the primary magnetic support for the mandrel provided at the cooling shoe station effects maximum stability and rigidity of the mandrel with respect to the shoe at the time of critical seam solidification. The magnet support for the mandrel in combination with the compressive, magnet-effected seam-shaping pressure of the mandrel constitute a stabilized cooperative relationship of the mandrel M with the seam forming instrumentalities 20, 22.

The mandrel rotational adjustment at 64 further permits precise formation of the fused lap longitudinal side seam S. In this connection, and as seen in FIGS. 8 and 9, mandrel M is canted or slightly tilted in a clockwise direction about its longitudinal axis as viewed from the downstream end, or toward the edge margin of the underlapped web portion. Thus, if the right-hand overlying web marginal lap as seen in FIG. 10 were reversed to become the underlap, the mandrel cant would then be set in the counterclockwise direction as viewed from downstream.

Figure 11:
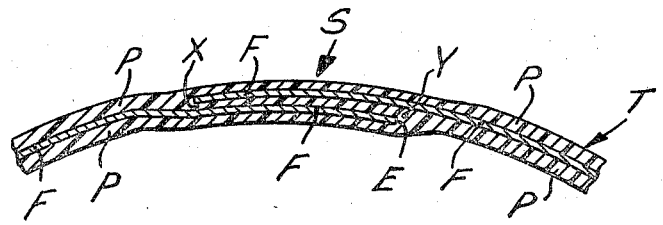

This angular adjustment permits the formation of a precision seam S characterized by a smoothly fused inner layer P completely covering the foil or other next adjacent or intermediate layer F. More particularly, with the disclosed angular relationship wherein the generally planar belt surfaces 28, 38 are non-parallel, the spacing therebetween is somewhat greater at the underlap edge of the lapped web area as seen at Y than at the left-hand overlap edge area X. Accordingly, as the lap fuses at the heating station, plastic flow or squeezeout tends to occur toward the wider belt gap, thereby insuring a smooth internal tube joint as the two lap plies are compressed to a lesser thickness. Further, this arrangement insures that the foil ply edge E (FIG. 10) will be fully coated throughout the tube length in the fused seam S as seen in FIG. 11, and cannot become or remain exposed for subsequent undesirable interaction with the ultimate tube contents.

To the foregoing angular adjustment, the instant invention also provides the vertical adjustment of the mandrel which, it will be seen, uniformly adjusts the mandrel and belt 28 in a vertical direction relative to the heating or cooling shoes, providing pressure control in response to laminate thickness, etc., as aforesaid, as well as permitting the highly desirable upstream end "float" of the mandrel.

Further, the said adjustments may be easily effected during operation of the apparatus, whereby there is no need to shut down tubing production.

While vertical and rotational adjustment of the magnetically supported mandrel is permitted, it will be seen that axial movement thereof is prevented inasmuch as mandrel heel 32 bears against fork 46 on the left in FIG. 3, while the shoulder formed by the larger diameter mandrel portion at the right-hand end of reduced portion 48 bears against saddle 60. This arrangement at the same time couples block member 50 against bracket 42 while permitting the requisite vertical movement thereof.

Further stability, if desired, may be imparted to the mandrel by providing a second magnetic support assembly at heating station 20 comparable to that at the cooling station 22.

It is thought that the invention and many of its attendant advantages will be understood from the foregoing description and it will be apparent that various changes may be made in the form, construction and arrangement of parts of the apparatus mentioned herein and in the steps and their order of accomplishment of the method described herein, without departing from the spirit and scope of the invention or sacrificing all of its material advantages, the apparatus and method hereinbefore described being merely a preferred embodiment thereof.

What is claimed is:

1. A longitudinal side seamer for web material, comprising:
   a frame;
   an elongated mandrel;
   means for continuously feeding and guiding said web material into continuous tubular form about said mandrel with the side edges of said web material disposed in longitudinally contiguous relationship;
   seam-forming instrumentalities carried by said frame for continuously forming said contiguous web edges into a seam; and
   magnet means for continuously urging said mandrel into a stabilized cooperative relationship with said seam-forming instrumentalities;
   said contiguous web edges being located relative to said mandrel and said seam-forming instrumentalities so that as said mandrel is being continuously urged into stabilized cooperative relationship with said seam-forming instrumentalities, said contiguous web edges are being continuously formed under a compressive seam shaping pressure between said mandrel and said seam-forming instrumentalities into a seam.

2. A side seamer, as defined in claim 1, wherein said contiguous web edges are heat fusible and said seam-forming instrumentalities comprise:
fusing means, disposed along said mandrel; and
cooling means, disposed along said mandrel, downstream of said fusing means.

3. A side seamer, as defined in claim 2, wherein said magnet means is disposed adjacent a downstream end portion of said mandrel.

4. A side seamer, as defined in claim 3, wherein said magnet means is disposed adjacent said cooling means.

5. A side seamer, as defined in claim 4, wherein said magnet means comprises a plurality of electromagnets having a pair of pole pieces cooperatively extending in parallel spaced relation to each other and adjacent the mandrel, and wherein said cooling means includes a coolant conduit disposed between said pole pieces for chilling said seam.

6. A longitudinal side seamer for web material, comprising:
a frame;
an elongated mandrel;
means for continuously feeding and guiding said web material into continuous tubular form about said mandrel, with the side edges of said web material being disposed in longitudinally contiguous relationship and being restrained against rotational movement about the longitudinal axis of said mandrel relative to the circumference of said mandrel;
seam-forming instrumentalities carried by said frame for forming said contiguous web edges into a seam;
magnet means for continuously urging said mandrel into stabilized cooperative relationship with said seam-forming instrumentalities;
said contiguous web edges being located relative to said mandrel and said seam-forming instrumentalities so that as said mandrel is being continuously urged into stabilized cooperative relationship with said seam-forming instrumentalities, said contiguous web edges are being continuously formed under a compressive, seam-shaping pressure, between said mandrel and said seam-forming instrumentalities, into a seam; and
means connected to said mandrel for incrementally rotating said mandrel about its longitudinal axis to vary the location on the circumference of said mandrel which is being urged into stabilized cooperative relationship with said seam-forming instrumentalites;
said contiguous web edges being incrementally rotatable by said mandrel rotating means to vary their location relative to said seam-forming instrumentalities along the circumference of said mandrel to vary the compressive, seam-shaping pressure between the contiguous web edges.

7. A side seamer, as defined in claim 6, wherein said seam-forming instrumentalities include two generally planar surfaces in confronting relationship about said contiguous web edges, the angle of the confronting relationship between said planar surfaces of said seam-forming instrumentalities being variable by said mandrel rotating means.

8. A side seamer, as defined in claim 5, wherein said mandrel rotating means comprises: a saddle for rotatably receiving said mandrel; and cooperating lever means on said mandrel and said saddle for tilting said mandrel about its longituinal axis.

9. A longituinal side seamer for web material, comprising:
a frame;
an elongated mandrel;
means for continuously feeding and guiding said web material into continuous tubular form about said mandrel with the side edges of said web material disposed in longitudinally contiguous relationship;
seam-forming instrumentalities carried by said frame for forming said contiguous web edges into a seam;
magnet means, disposed adjacent to a first end portion of said mandrel for continuously urging said first mandrel end portion into stabilized cooperative relationship with said seam-forming instrumentalities; and
means, connected to the other, second end portion of said mandrel, for restraining movement of said mandrel axially thereof and for floatingly supporting said other, second mandrel end portion so that the axis of said second end portion is in substantially linear aligment with the axis of said first mandrel end portion.

10. A side seamer, as defined in claim 9, wherein said other, second mandrel end portion is the upstream end portion of said mandrel and wherein said restraining and floatingly supporting means includes: saddle means for seating said second mandrel end portion, said saddle means being adapted to restrain said second mandrel end portion from downward movement away from said seam-forming instrumentalities; and cooperating means, on said second mandrel end portion and on said saddle means, for regulating upward movement of said second mandrel and wherein said second mandrel end portion includes a and for restraining said mandrel from movement away from said saddle, along the path of said web material.

11. A side seamer, as defined in claim 10, wherein said restraining and floatingly supporting means includes upstanding, bifurcated saddle legs on said saddle means and wherein said second mandrel end portion includes a portion of reduced width, said reduced width portion of said second mandrel end portion being seated in said saddle means and being embraced by said bifurcated saddle legs.

12. A longitudinal side seamer for web material, comprising:
a frame;
an elongated mandrel;
means for continuously feeding and guiding said web material into continuous tubular form about said mandrel, with the side edges of said web material being disposed in longitudinally contiguous relationship and being restrained against rotational movement about the longitudinal axis of said mandrel relative to the circumference of said mandrel;
seam-forming instrumentalities carried by said frame for forming said contiguous web edges into a seam;
magnet means, disposed adjacent to a first end portion of said mandrel for continuously urging said first mandrel end portion into stabilized cooperative relationship with said seam-forming instrumentalities;
said contiguous web edges being located relative to said mandrel and said seam-forming instrumentalities so that as said mandrel is being continuously urged into stabilized cooperative relationship with said seam-forming instrumentalities, said contiguous web edges are being continuously formed under a compressive, seam-shaping pressure, between said mandrel and said seam-forming instrumentalities, into a seam; and
means connected to said mandrel for incrementally rotating said mandrel about its longitudinal axis to vary the location on the circumference of said mandrel which is being urged into stabilized cooperative relationship with said seam-forming instrumentalities;
said contiguous web edges being incrementally rotatable by said mandrel rotating means to vary their location relative to said seam-forming instrumentalities along the circumference of said mandrel to vary the compressive, seam shaping pressure between said contiguous web edges; and means, connected to the other, second end portion of said mandrel, for restraining movement of said mandrel axially thereof and for floatingly supporting said other, second mandrel end portion so that the axis of said second end portion is in substantially linear alignment with the axis of said first mandrel end portion.

13. A side seamer, as defined in claim 12, wherein said contiguous web edges are heat fusible and said seam-forming instrumentalities comprise:

fusing means, disposed along said mandrel, and cooling means, disposed along said mandrel, downstream of said fusing means;

and wherein said magnet means comprise a plurality of electromagnets having a pair of pole pieces cooperatively extending in parallel spaced relation to each other and adjacent the mandrel, and wherein said cooling means includes a coolant conduit disposed between said pole pieces for chilling said seam.

14. A side seamer, as defined in claim 13, wherein said seam-forming instrumentalities include two generally planar surfaces in confronting relationship about said contiguous web edges, the angle of the confronting relationship between said planar surfaces of said seam-forming instrumentalities being variable by said mandrel rotating means.

15. A side seamer, as defined in claim 12, wherein said seam-forming instrumentalities include two generally planar surfaces in confronting relationship about said contiguous web edges, the angle of the confronting relationship between said planar surfaces of said seam-forming instrumentalities being variable by said mandrel rotating means; and wherein said mandrel rotating means comprises: a saddle for rotatably receiving said mandrel; and cooperating lever means on said mandrel and said saddle for tilting said mandrel about its longitudinal axis.

16. A side seamer, as defined in claim 14, wherein said other, second mandrel end portion is the upstream end portion of said mandrel and wherein said restraining and floatingly supporting means includes: saddle means being adapted to restrain said second mandrel end portion from downward movement away from said seam-forming instrumentalities; and cooperating means, on said second mandrel end portion and on said saddle means, for regulating upward movement of said second mandrel end portion towards said seam-forming instrumentalities and for restraining said mandrel from movement away from said saddle, along the path of said web material.

17. A side seamer, as defined in claim 12, wherein said other, second mandrel end portion is the upstream end portion of said mandrel; wherein said restraining and floatingly supporting means includes: saddle means being adapted to restrain said second mandrel end portion from downward movement away from said seam forming instrumentalities; and cooperating means, on said second mandrel end portion and on said saddle means, for regulating upward movement of said second mandrel end portion towards said seam forming instrumentalities and for restraining said mandrel from movement away from said saddle, along the path of said web material; and wherein said restraining and floatingly supporting means includes upstanding, bifurcated saddle legs or said saddle means and wherein said second mandrel end portion includes a portion of reduced width, said reduced width portion of said second mandrel end portion being seated in said saddle means and being embraced by said bifurcated saddle legs.

References Cited

UNITED STATES PATENTS

| | | | |
|---|---|---|---|
| 2,457,032 | 12/1948 | Case | 248—206X |
| 3,083,130 | 3/1963 | Strandquist | 156—498X |
| 3,388,017 | 6/1968 | Grimsley et al. | 156—498X |

SAMUEL FEINBERG, Primary Examiner

J. J. DEVITT, Assistant Examiner

U.S. Cl. X.R.

156—203, 446, 498